(12) United States Patent
Ashley (10) Patent No.: US 11,827,652 B2
(45) Date of Patent: Nov. 28, 2023

(54) HYDROGENATION OF NITROGEN

(71) Applicant: IMPERIAL COLLEGE INNOVATIONS LIMITED, London (GB)

(72) Inventor: Andrew Ashley, London (GB)

(73) Assignee: IMPERIAL COLLEGE INNOVATIONS LIMITED, London (GB)

( * ) Notice: Subject to any disclaimer, the term of this patent is extended or adjusted under 35 U.S.C. 154(b) by 0 days.

(21) Appl. No.: 17/281,852

(22) PCT Filed: Oct. 4, 2019

(86) PCT No.: PCT/GB2019/052812
§ 371 (c)(1),
(2) Date: Mar. 31, 2021

(87) PCT Pub. No.: WO2020/070517
PCT Pub. Date: Apr. 9, 2020

(65) Prior Publication Data
US 2021/0284673 A1    Sep. 16, 2021

(30) Foreign Application Priority Data
Oct. 5, 2018   (GB) ...................... 1816280

(51) Int. Cl.
*C07F 15/02*   (2006.01)
*C07B 43/04*   (2006.01)
(52) U.S. Cl.
CPC ............ *C07F 15/025* (2013.01); *C07B 43/04* (2013.01)
(58) Field of Classification Search
CPC .............................. C07F 15/025; C07B 43/04
See application file for complete search history.

(56) References Cited

U.S. PATENT DOCUMENTS

2015/0104371 A1*   4/2015   Peters ...................... C01C 1/026
                                                                423/407

OTHER PUBLICATIONS

Hawley's Condensed Chemical Dictionary, p. 828 (16th ed., 2016, R.J. Larrañaga ed.) (Year: 2016).*
CAS Abstract and Indexed Compounds, H. Oshita et al., 456 Journal of Organometallic Chemistry, 213-220 (1993) (Year: 1993).*
J. March, Advanced Organic Chemistry Reactions, Mechanisms and Structure 248-272 (4th ed., 1992) (Year: 1992).*
D. Yandulov et al., 301 Science, 76-78 (2003) (Year: 2003).*
P. Hill et al., 138 Journal of the American Chemical Society, 13251-13524 (2016) (Year: 2016).*
S. Komiya et al., J. Chem. Soc., Chem. Commun., 787-788 (1993) (Year: 1993).*
J. Cornelis et al., 43 Chem. Soc. Rev., 5183-5191 (2014) (Year: 2014).*
R. Schrock, 38 Accounts of Chemical Research, 955-962 (2005) (Year: 2005).*
G. Connor et al., 286 Catalysis Today, 21-40 (2017) (Year: 2017).*
S. Licht et al., 345 Science, 637-640 (2014) (Year: 2014).*
Y. Ashida et al., 57 Chem. Commun., 1176-1189 (2021) (Year: 2021).*
L. Doyle et al., 45 Dalton Transactions, 7550-7554 (2016) (Year: 2016).*
D. Hall et al., J. Chem. Soc., Dalton Trans., 3539-3541 (1996) (Year: 1996).*
Wikipedia, Valence Electron (Oct. 5, 2018) (Year: 2018).*
M Green, 500 Journal of Organometallic Chemistry, 127-148 (1995) (Year: 1995).*
CAS Abstract and Graphical Structure Representation of RN 139362-04-2 (1992) (Year: 1992).*
CAS Abstract and Graphical Structure Representation of RN 585524-03-4 (2003) (Year: 2003).*
L. Field et al., 54 Inorganic Chemistry, 4768-4776 (2015) (Year: 2015).*
A. Piascik et al., 140 The Journal of the American Chemical Society, 10691-10694 (2018) (Year: 2018).*
Y. Zhu et al., 34 Synthetic Communications, 3167-3174 (2004) (Year: 2004).*
G. Prakash et al., 15 Synlett, 2395-2399 (2007) (Year: 2007).*
International Search Report with Written Opinion corresponding to International Patent Application No. PCT/GB2019/052812, dated Dec. 16, 2019.
Oshita, Hiroyuki et al: "Preparation and properties of molybdenum and tungsten dinitrogen complexes XLI. Silylation and germylation of a coordinated dinitrogen in cis—[M(N2)2(PMe2Ph)4] (M=Mo, W) using R3EC1/NaI and R3EC1/Na mixtures (E=Si, Ge). X-ray structure of trans-[WI (NNGePh3) (PMe2Ph)4], cntdot.C6H6", Journal of Organometallic Chemistry, vol. 456, No. 2, Sep. 27, 1993, pp. 213-220.
Albertin, Gabriele et al: "Preparation of dinitrogen complexes Mo(N2)2P4 stabilized by phyosphonite PPh(OEt) 2 and phosphinite PPh2(OEt) ligands", Journal of Organometallic Chemistry, vol. 660, No. 1, Oct. 7, 2002, pp. 55-61.
Nishibayashi, Yoshiaki et al., "Formation of Ammonia in the Reactions of a Tungsten Dinitrogen with Ruthenium Dihydrogen Complexes under Mild Reaction Conditions", Inorganic Chemistry, vol. 39, No. 26, Nov. 29, 2000, pp. 5946-5957.
Yuki, Masahiro et al., "Iron-catalyzed transformation of molecular dinitrogen into silylamine under ambient conditions", Nature Communications, vol. 2264, Dec. 4, 2012, pp. 1-6.

(Continued)

*Primary Examiner* — Alexander R Pagano
(74) *Attorney, Agent, or Firm* — Brian Trinque; Nicole Sassu; Lathrop GPM LLP (57) ABSTRACT

The invention relates to methods for the hydrogenation of nitrogen by reducing a N≡N bond in a metal complex comprising a N≡N bond by reacting the metal complex with a Lewis acid, wherein the metal complex comprises Cr, Mo, W, Mn, Tc, Re, Fe, Ru, Os, Co, Rh, Ir, Ni, Pd or Pt.

23 Claims, 3 Drawing Sheets

(56) References Cited

OTHER PUBLICATIONS

Peter J. Hill et al., "Selective Catalytic Reduction of $N_2$ to $N_2H_4$ by a Simple Fe Complex", Journal of the American Chemical Society, vol. 138, No. 41, Oct. 4, 2016, pp. 13521-13524.

* cited by examiner

HYDROGENATION OF NITROGEN

TECHNICAL FIELD

The present invention related to methods that may be used for hydrogenation of a compound comprising a N≡N bond.

BACKGROUND OF THE INVENTION

Ammonia ($NH_3$) is used for fertilisers to sustain humanity, and is made using the Haber-Bosch process (around 180 million metric tonnes $NH_3$ produced per year). Nitrogen ($N_2$) and hydrogen ($H_2$) react at extreme temperatures and pressures (around 400° C. and 150-250 atm) over a solid iron catalyst which, crucially, contains potassium ion ($K^+$) promoters. This consumes around 1-2% of global energy and necessitates expensive reaction infrastructure. Even minor improvements in energy-efficiency would yield an impressive commercial advantage.

The catalytic direct hydrogenation of $N_2$ to $NH_3$ under ambient conditions is one of the highest aspirations of modern chemistry yet to date none exists. $N_2$ fixation by simple $Fe^0P_4(N_2)$ complexes (where P is a tertiary phosphine ligand such as depe, $Et_2PCH_2CH_2PEt_2$) have been explored, showing that these are very efficient at producing $N_2H_4$ and/or $NH_3$ upon acidification (L. R. Doyle et al., Dalton Trans., 2016, 45, 7550-7554, the entire contents of which are herein incorporated by reference). Of note is that the corresponding dihydride compounds, $Fe^{II}P_4(H)_2$, which form from reaction of $Fe^0P_4(N_2)$ and $H_2$, can be interconverted using light, i.e.

$$Fe^0P_4(N_2)+H_2H \leftrightarrow Fe^{II}P_4(H)_2+N_2$$

This demonstrates that exchange between $N_2$ and $H_2$ on the same metal-ligand platform is achievable, which is a prerequisite for any catalytic $N_2+H_2 \rightarrow 2NH_3$ process. Furthermore, these compounds were shown to be remarkably efficient at the catalytic fixation of $N_2$ to hydrazine ($N_2H_4$) and $NH_3$ (P. J. Hill et al., J. Am. Chem. Soc., 2016, 138 (41), 13521-13524, the entire contents of which are herein incorporated by reference) using proton and electron sources. This occurs at atmospheric pressure and even sub-ambient temperatures (for example, −35° C.) because it occurs via proton-coupled-electron transfer (the same mechanism operative for nitrogenase enzymes in nature).

J. A. Pool et al., Nature, 2004, 427, 527-530, the entire contents of which are herein incorporated by reference, discloses a method which relies on a bespoke Zirconium complex to directly hydrogenate $N_2$. However, this requires a temperature of about 85° C. and also produces a dihydride ($ZrH_2$). It is not possible to displace $H_2$ with $N_2$ in the $ZrH_2$ species, thereby preventing the completion of a catalytic cycle.

G. P. Connor et al., Catalysis Today, 2017, 286, 21-40, the entire contents of which are herein incorporated by reference, sets out a review of the field of $N_2$ reduction, such as the hydrogenation of $N_2$, using heterogeneous metal catalysis and co-catalytic alkali metal promoters and highlights the need in the art for comparable homogenous systems that are able to achieve this.

Thus, there remains a need for methods for the hydrogenation of $N_2$ at room temperature and pressure.

SUMMARY OF THE INVENTION

It has been determined that metal complexes comprising a N≡N bond may react with a Lewis acid, triggering electron transfer between metal centres resulting in a reduced metal complex containing a reduced, weakened and activated, N≡N bond. This complex containing a reduced N≡N bond may then react with a source of hydrogen to form N—H bonds. Thus, the invention enables, for example, the hydrogenation of $N_2$ at room temperature and pressure.

The invention relates to a method of reducing a N≡N bond. In a first aspect, the invention provides a method comprising:
 a) providing a metal complex comprising a N≡N bond; and
 b) reducing said N≡N bond, by reacting the metal complex with a Lewis acid;
 wherein the metal complex comprises Cr, Mo, W, Mn, Tc, Re, Fe, Ru, Os, Co, Rh, Ir, Ni, Pd or Pt.

The metal complex comprising a N≡N bond may comprise one or more ligands in order to provide a stable metal centre.

The metal complex comprising a N≡N bond may be described by the formula $ML_lX_xZ_z$, wherein M is the metal (Cr, Mo, W, Mn, Tc, Re, Fe, Ru, Os, Co, Rh, Ir, Ni, Pd or Pt); L, X and Z are the ligating atoms of two or more ligands; and l, x and z are integers taken such that the valence shell of the metal has 18 electrons, wherein at least one of the two or more ligands is N≡N. L is a ligating atom that donates a pair of electrons to form a dative bond with the metal. X is a ligating atom that donates one electron to form a bond with the metal. Z is a ligating atom that accepts a pair of electrons from the metal to form a bond with the metal.

Accordingly, the metal complex may have the formula

$$Z_{z'}X_{x'}L_{l'}M-N≡N,$$

wherein M is Cr, Mo, W, Mn, Tc, Re, Fe, Ru, Os, Co, Rh, Ir, Ni, Pd or Pt; L, X and Z are ligating atoms of one or more ligands and l', x' and z' are integers taken such that the valence shell of the metal has 18 electrons.

Suitable ligands include:
 a) ligands having two electron-donating-ligating atoms (L-type), such as phosphine or phosphite (e.g., P(alkyl)$_3$ or P(O-alkyl)$_3$), sulfide (e.g., S(alkyl)$_2$) and dinitrogen ($N_2$); and
 b) ligands having one-electron-donating-ligating atoms (X-type), such as H, alkyl (e.g., $CH_3$, $CH_2CMe_3$, $CH_2SiMe_3$ and $CH_2CMe_2Ph$), aryl (e.g., $C_6H_5$), dialkylamino (e.g., N(alkyl)$_2$), alkoxy (e.g., O-alkyl) and thiolate (e.g., S-alkyl); and
 c) polyhapto ligands, such as $\eta^5$-$C_5$(alkyl)$_m$(aryl)$_{m'}$(trialkyl silyl)$_{m''}$H$_n$, where m, m', m'' and n are integers and m+m'+m''+n=5.

The one or more ligands may each independently be selected from H, an alkyl ligand, a phosphine ligand, a sulfide ligand, a thiolate ligand, dinitrogen or an optionally substituted $\eta^5$-cyclopentadienyl ligand, or a mixture thereof.

The one or more ligands may each independently be a phosphine ligand. A phosphine ligand may be:
 a) a monophosphine ligand, for example having the formula wherein each R is independently selected from alkyl or aryl, each optionally substituted with one or more of alkyl, cycloalkyl, aryl, OH, alkoxy or amino;

b) a diphosphine ligand, for example having the formula wherein each R is independently selected from alkyl or aryl, each optionally substituted with one or more of phenyl, OH or $C_{1-6}$ alkoxy; and Y is an alkylene linker having 1-6 carbon atoms optionally interrupted with aryl, —NH—, —N(alkyl)-, —S—, —S(alkyl)-, —$PH_2$—, —PH(alkyl)-, —PH(aryl)-, —P(alkyl)$_2$- and optionally substituted with one or more of alkyl, cycloalkyl, aryl, OH, alkoxy or amino;

c) a triphosphine ligand, for example having the formula wherein each R is independently selected from alkyl or aryl, each optionally substituted with one or more of aryl, OH or alkoxy; and each Y is independently an alkylene linker having 1-6 carbon atoms optionally interrupted with aryl, —NH—, —N(alkyl)-, —S—, —S(alkyl)-, —$PH_2$—, —PH(alkyl)-, —PH(aryl)-, —P(alkyl)$_2$- and optionally substituted with one or more of alkyl, cycloalkyl, aryl, OH, alkoxy or amino; or d) a tetraphosphine ligand, for example having the formula wherein each R is independently selected from alkyl or aryl, each optionally substituted with one or more of aryl, OH or $C_{1-6}$ alkoxy; and each Y is independently an alkylene linker having 1-6 carbon atoms optionally interrupted with aryl, —NH—, —N(alkyl)-, —S—, —S(alkyl)-, —$PH_2$—, —PH(alkyl)-, —PH(aryl)-, —P(alkyl)$_2$- and optionally substituted with one or more of alkyl, cycloalkyl, aryl, OH, alkoxy or amino.

The one or more ligands may each independently be an alkyl ligand. Preferably an alkyl ligand does not contain a beta hydrogen. An alkyl ligand may have the structure $CR^2{}_3$, wherein each $R^2$ is independently H, trialkyl silyl (optionally trimethyl silyl), aryl (optionally substituted with one or more of alkyl, cycloalkyl, aryl, OH, alkoxy or amino) or $CR^3{}_3$, wherein each $R^3$ is independently alkyl, trialkyl silyl (optionally trimethyl silyl), cycloalkyl or aryl, each optionally substituted with one or more of alkyl, cycloalkyl, aryl, OH, alkoxy or amino, or two $R^3$ taken with the atom to which they are attached to form a cycloalkyl ring, optionally substituted with one or more of alkyl, cycloalkyl, aryl, OH, alkoxy or amino. An alkyl ligand may be methyl, neopentyl ($CH_2{}^tBu$), neosilyl ($CH_2SiMe_3$), $CH_2CMe_2Ph$, or 1-norbornyl.

The one or more ligands may each independently be a sulfide ligand. Preferably a sulfide ligand has the structure $SR^4{}_2$, wherein each $R^4$ is independently alkyl, cycloalkyl or aryl, each optionally substituted with one or more of alkyl, cycloalkyl, aryl, OH, alkoxy or amino.

The one or more ligands may each independently be a thiolate ligand. Preferably a thiolate ligand has the structure $SR^4$, wherein each $R^4$ is independently alkyl, cycloalkyl or aryl, each optionally substituted with one or more of alkyl, cycloalkyl, aryl, OH, alkoxy or amino.

The one or more ligands may each independently be a pentahapto cyclopentadienyl ligand optionally substituted with alkyl, aryl or trialkyl silyl (preferably trimethyl silyl). For example, a pentahapto cyclopentadienyl ligand may be cyclopentadienyl (Cp; $C_5H_5$), $C_5H_2(SiMe_3)_3$, $C_5H_2(tBu)_3$, $C_5(iPr)_5$ and $C_5(Ph)_5$.

The one or more ligands may each independently be a polydentate ligand having more than one different ligating atom. For example, the one or more ligands may each independently be a phosphine sulfide, for example having the formula $R_2P$—Y—$SR^4$, wherein each R is independently selected from alkyl or aryl, each optionally substituted with one or more of phenyl, OH or $C_{1-6}$ alkoxy, Y is an alkylene linker having 1-6 carbon atoms optionally interrupted with aryl, —NH—, —N(alkyl)-, —S—, —S(alkyl)-, —$PH_2$—, —PH(alkyl)-, —PH(aryl)-, —P(alkyl)$_2$- and optionally substituted with one or more of alkyl, cycloalkyl, aryl, OH, alkoxy or amino, and each $R^4$ is independently alkyl, cycloalkyl or aryl, each optionally substituted with one or more of alkyl, cycloalkyl, aryl, OH, alkoxy or amino.

The metal complex comprising a N≡N bond may have the following structure:

wherein each is independently a bidentate, diphosphine ligand. For example, the metal complex may have the formula:

The metal complex comprising a N≡N bond may preferably be a Fe complex.

The Lewis acid may be an alkali metal ion ($Li^+$, $Na^+$, $K^+$, $Rb^+$ or $Cs^+$, optionally $Li^+$, $Na^+$ or $K^+$), an alkaline earth metal ion ($Be^{2+}$, $Mg^{2+}$, $Ca^{2+}$, $Sr^{2+}$ or $Ba^{2+}$, optionally $Be^{2+}$, $Mg^{2+}$ or $Ca^{2+}$), a Scandium ion (e.g. $Sc^{3+}$), a Group 4 metal ion (optionally $Ti^{3+}$, $Zr^{3+}$, $Zr^{4+}$ or $Hf^{4+}$), a Group 13 compound (optionally comprising $B^{3+}$ or $Al^{3+}$), a lanthanide metal ion in the +3 oxidation state ($La^{3+}$, $Ce^{3+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$ or $Lu^{3+}$), or a mixture thereof.

The Lewis acid may be an alkali metal ion ($Li^+$, $Na^+$, $K^+$, $Rb^+$ or $Cs^+$, optionally $Li^+$, $Na^+$ or $K^+$), an alkaline earth metal ion ($Be^{2+}$, $Mg^{2+}$, $Ca^{2+}$, $Sr^{2+}$ or $Ba^{2+}$, optionally $Be^{2+}$, $Mg^{2+}$ or $Ca^{2+}$), a Group 4 metal ion (optionally $Ti^{3+}$, $Zr^{3+}$, $Zr^{4+}$ or $Hf^{4+}$), a Group 13 compound (optionally comprising $B^{3+}$ or $Al^{3+}$), a lanthanide metal ion in the +3 oxidation state ($La^{3+}$, $Ce^{3+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$ or $Lu^{3+}$), or a mixture thereof. Optionally, the Lewis acid may be an alkali metal ion ($Li^+$, $Na^+$, $K^+$, $Rb^+$ or $Cs^+$, optionally $Li^+$, $Na^+$ or $K^+$).

The Lewis acid may be provided in the form $AB_p$, wherein A is an alkali metal ion ($Li^+$, $Na^+$, $K^+$, $Rb^+$ or $Cs^+$, optionally $Li^+$, $Na^+$ or $K^+$), an alkaline earth metal ion ($Be^{2+}$, $Mg^{2+}$, $Ca^{2+}$, $Sr^{2+}$ or $Ba^{2+}$, optionally $Be^{2+}$, $Mg^{2+}$ or $Ca^{2+}$), a Scandium ion (e.g. $Sc^{3+}$), a Group 4 metal ion (optionally $Ti^{3+}$, $Zr^{3+}$, $Zr^{4+}$ or $Hf^{4+}$), a Group 13 compound (optionally comprising $B^{3+}$ or $Al^{3+}$), a lanthanide metal ion in the +3 oxidation state ($La^{3+}$, $Ce^{3+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$ or $Lu^{3+}$), or a mixture thereof; B is a counteranion; and p is an integer selected such that the charge of B balances the charge of A.

The Lewis acid may be provided in the form $AB_p$, wherein A is an alkali metal ion ($Li^+$, $Na^+$, $K^+$, $Rb^+$ or $Cs^+$, optionally $Li^+$, $Na^+$ or $K^+$), an alkaline earth metal ion ($Be^{2+}$, $Mg^{2+}$, $Ca^{2+}$, $Sr^{2+}$ or $Ba^{2+}$, optionally $Be^{2+}$, $Mg^{2+}$ or $Ca^{2+}$), a Group 4 metal ion (optionally $Ti^{3+}$, $Zr^{3+}$, $Zr^{4+}$ or $Hf^{4+}$), a Group 13 compound (optionally comprising $B^{3+}$ or $Al^{3+}$), a lanthanide metal ion in the +3 oxidation state ($La^{3+}$, $Ce^{3+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$ or $Lu^{3+}$), or a mixture thereof; B is a counteranion; and p is an integer selected such that the charge of B balances the charge of A.

B is optionally selected from a borate-based anion, a carborane-based anion, a phosphate anion, a sulfonate anion, a perfluoroalkoxyaluminate anion, an imide anion or an alkoxy- or aryloxymetallate. B is optionally selected from the following:

where q is an integer from 1 to 10, preferably 1 to 6, preferably 1.

The method may be a catalytic method.

The step of reducing said N≡N bond may comprise reacting the metal complex with a stoichiometric amount of a Lewis acid to form a reduced N≡N bond. Optionally step of reducing said N≡N bond may comprise reacting the metal complex in a molar ratio of about 2:1 Lewis acid:metal complex The step of reducing said N≡N bond may comprise reacting the metal complex with a Lewis acid in a molar ratio of greater than 1 to 1 Lewis acid to metal complex to form a reduced N≡N bond. The step of reducing said N≡N bond may comprise reacting the metal complex with a Lewis acid in a molar ratio of at least about 1.5 to 1 Lewis acid to metal complex or 2 to 1 Lewis acid to metal complex to form a reduced N≡N bond, preferably in a molar ratio of about 2:1 Lewis acid:metal complex.

The step of reducing said N≡N bond, by reacting the metal complex comprising a N≡N bond with a Lewis acid, may be carried out under an inert atmosphere and optionally in an organic solvent (optionally a solvent selected from the group consisting of ethereal solvents, aromatic solvents or straight chain hydrocarbon solvents or a mixture thereof, preferably an ether solvent, such as diethyl ether).

The metal complex comprising a N≡N bond may be prepared by a method comprising:
i) providing a compound comprising a N≡N bond; and
ii) reacting the compound comprising a N≡N bond with a reagent of formula wherein M is Cr, Mo, W, Mn, Tc, Re, Fe, Ru, Os, Co, Rh, Ir, Ni, Pd or Pt; L, X and Z are ligating atoms of one or more ligands and l', x' and z' are integers taken such that the valent shell of the metal has 18 electrons; and each X' is independently a leaving group.

Each X' may preferably independently be a halide (preferably Cl, Br or I), H, tosylate or triflate. Preferably each X' is independently a halide or H.

The method may comprise the following steps:
i) providing a compound comprising a N≡N bond;
ii) reacting the compound comprising a N≡N bond with a reagent of formula to form a metal complex comprising a N≡N bond; and
iii) reducing said N≡N bond, by reacting the metal complex comprising a N≡N bond with a Lewis acid;
wherein M is Cr, Mo, W, Mn, Tc, Re, Fe, Ru, Os, Co, Rh, Ir, Ni, Pd or Pt; L, X and Z are ligating atoms of one or more ligands and l', x' and z' are integers taken such that the valent shell of the metal has 18 electrons; and each X' is independently a leaving group.

The step of reacting the compound comprising a N≡N bond with a reagent may be carried out in the presence of a reducing agent (optionally potassium graphite, an alkali metal (e.g., Li, Na or K), an alkaline earth metal (e.g., Mg or Ca), sodium amalgam Na(Hg), potassium amalgam K(Hg), lithium naphthalenide or sodium naphthalenide, or a mixture thereof) and/or in an organic solvent (optionally pentane, diethyl ether or tetrahydrofuran, or a mixture thereof).

The compound comprising a N≡N bond may be provided as gaseous $N_2$ or a complex binding $N_2$. Where the compound comprising a N≡N bond may be provided as gaseous $N_2$, the step of reacting the compound comprising a N≡N bond with a reagent may be carried out under a nitrogen atmosphere.

The compound comprising a N≡N bond may be provided as gaseous $N_2$ at a pressure of gaseous $N_2$ of about 100 to about 1000 kPa, optionally a pressure of about 200 to about 500 kPa.

The method may further comprise:
c) contacting the reduced N≡N bond with a source of hydrogen.

The source of hydrogen may optionally be gaseous $H_2$.

The reduced N≡N bond may be contacted with gaseous $H_2$ at a pressure of about 100 to about 1000 kPa, optionally about 200 to about 500 kPa.

The method may further comprise contacting the reduced N≡N bond with a source of hydrogen such that it results in a cleaved N≡N bond and formation of a N—H bond.

The method described herein may be carried out in an organic solvent, preferably a solvent selected from the group consisting of ethereal solvents, aromatic solvents or straight chain hydrocarbon solvents or a mixture thereof. Preferably, the solvent is ether or pentane.

In a second aspect, the invention provides a catalytic process for cleaving a N≡N bond, comprising:
reacting a metal complex comprising a N≡N bond with a stoichiometric amount of a reducing agent in the presence of a Lewis acid.

The metal complex comprising a N≡N bond and Lewis acid may be as described in relation to the first aspect of the invention.

The Lewis acid may be present in a molar ratio of greater than 1 to 1 Lewis acid to metal complex. The Lewis acid may be present in a molar ratio of at least about 1.5 to 1, or about 2 to 1 to the metal complex, preferably in a molar ratio of about 2 to 1 Lewis acid:metal complex.

In a third aspect, the invention provides the use of a metal complex comprising a N≡N bond in combination with a Lewis acid to reduce said N≡N bond; wherein the metal complex comprises Cr, Mo, W, Mn, Tc, Re, Fe, Ru, Os, Co, Rh, Ir, Ni, Pd or Pt.

The metal complex comprising a N≡N bond and/or Lewis acid may be as described in relation to the first aspect of the invention.

In a fourth aspect, the invention provides a compound of formula:

wherein M is Cr, Mo, W, Mn, Tc, Re, Fe, Ru, Os, Co, Rh, Ir, Ni, Pd or Pt; L, X and Z are ligating atoms of one or more ligands and l', x' and z' are integers taken such that the valent shell of the metal has 18 electrons; and A is a Lewis acid.

The one or more ligands and/or the Lewis acid may be as described in relation to the first aspect of the invention.

The features discussed in relation to the method of the first aspect of the invention apply mutatis mutandis to all other aspects of the invention, including the methods, uses and compounds described above.

DETAILED DESCRIPTION

The invention relates to a method of reducing a N≡N bond. It has been determined that a transition metal complex comprising a N≡N bond may react with a Lewis acid, triggering electron transfer between metal centres resulting in a metal complex containing a reduced N≡N bond. As the N≡N bond is reduced it becomes highly activated, predisposing the group to further reactivity. This reduction of the N≡N bond may lead to the breaking of the N≡N bond. The invention can also be described as a method of activating a N≡N bond.

Reduction of N≡N bond in the metal complex comprising a N≡N bond forms a metal complex containing a reduced N≡N bond. This complex containing a reduced N≡N bond may react with a source of hydrogen to form N—H bonds. Thus, the invention enables, for example, the hydrogenation of $N_2$ at room temperature and pressure.

For example, $Fe^0P_4(N_2)$ (wherein each P is the ligating atom of a phosphine ligand, such as a bidentate, diphosphine ligand) reacts with $K^+$ ions, triggering electron transfer between Fe centres and installing a rapid equilibrium between $Fe^0P_4(N_2)$, $[Fe^IP_4]^+$ and a paramagnetic metal complex comprising a reduced N≡N bond. The latter may be formulated as $[FeP_4(N\text{—}N)]^{n-}[K^+]_n$, containing highly 'activated' $N_2$. This may react irreversibly with $H_2$ at room temperature and atmospheric pressure to form another paramagnetic species containing N—H bonds and $Fe^{II}P_4(H)_2$.

The latter may be converted back to Fe⁰P₄(N₂), and is thus conducive to a catalytic cycle.

The invention relates to a method of reducing a N≡N bond. Accordingly, in a first aspect, the invention provides a method comprising:

a) providing a metal complex comprising a N≡N bond; and b) reducing said N≡N bond, by reacting the metal complex with a Lewis acid to form a reduced N≡N bond;

wherein the metal complex comprises Cr, Mo, W, Mn, Tc, Re, Fe, Ru, Os, Co, Rh, Ir, Ni, Pd or Pt.

The metal complex comprises Cr, Mo, W, Mn, Tc, Re, Fe, Ru, Os, Co, Rh, Ir, Ni, Pd or Pt. Such metal complexes have been shown to bind a compound comprising a N≡N bond, such as dinitrogen. Examples of such metal complexes binding dinitrogen are disclosed in Transition Metal-Dinitrogen Complexes, Ed. Yoshiaki Nishibayashi, Wiley-VCH, 2019, ISBN: 978-3-527-34425-3, the entire contents of which are herein incorporated by reference. Optionally, the metal complex comprises Fe.

The metal complex comprising a N≡N bond may be described by the formula $ML_lX_xZ_z$, wherein M is the transition metal (Cr, Mo, W, Mn, Tc, Re, Fe, Ru, Os, Co, Rh, Ir, Ni, Pd or Pt), L, X and Z are the ligating atoms of two or more ligands and l, x and z are integers taken such that the valence shell of the metal has 18 electrons, wherein at least one of the two or more ligands is N≡N. For example, as a skilled person would appreciate, each l, x and z may independently be 0, 1, 2, 3, 4, 5 or 6 depending on the metal and the ligands.

L is a ligating atom that donates a pair of electrons to form a dative bond with the metal. X is a ligating atom that donates one electron to form a bond with the metal. Z is a ligating atom that accepts a pair of electrons from the metal to form a bond with the metal.

One of the two or more ligands is N≡N. The other one or more ligands of the two or more ligands may independently be monodentate (i.e., the ligand coordinates through a ligating atom at a single coordination site), polydentate (i.e., the ligand coordinates through more than one non-contiguous ligating atom at separate coordination sites) or polyhapto (i.e., the ligand coordinates through more than one contiguous ligating atom). It will be appreciated that the one or more ligands may comprise additional functionalities that do not bind to the metal (e.g., a monodentate ligand may comprise two potential coordination sites to a metal, but only coordinates to the metal at one of said sites).

This method of ligating atom classification is known as the Covalent Bond Classification system and is described in M. L. H. Green, J. Organomet. Chem., 1995, 500, 127-148, the entire contents of which are herein incorporated by reference.

The metal complex comprises Cr, Mo, W, Mn, Tc, Re, Fe, Ru, Os, Co, Rh, Ir, Ni, Pd or Pt. The metal complex may comprise a single metal centre. Thus, the metal complex may be a Cr, Mo, W, Mn, Tc, Re, Fe, Ru, Os, Co, Rh, Ir, Ni, Pd or Pt complex. The metal complex may comprise more than one metal centre, each independently selected from Cr, Mo, W, Mn, Tc, Re, Fe, Ru, Os, Co, Rh, Ir, Ni, Pd or Pt.

The metal complex may have the formula $Z_{z'}X_{x'}L_{l'}M\text{-}N\!\equiv\!N$, wherein M is Cr, Mo, W, Mn, Tc, Re, Fe, Ru, Os, Co, Rh, Ir, Ni, Pd or Pt; L, X and Z are ligating atoms of one or more ligands and l', x' and z' are integers taken such that the valence shell of the metal has 18 electrons. Thus, the N≡N bond is one of the two or more ligands present in the metal complex described by the formula $ML_lX_xZ_z$. The N≡N bond contributes a pair of electrons to form a dative bond with the metal (i.e., the nitrogen of the N≡N bond is an L-type ligating atom). Therefore, the $L_lX_xZ_zM\text{-}$ fragment comprises 16 electrons in the valent shell of the metal.

The metal complex is able to bind the compound comprising a N≡N bond in an "end-on" arrangement, as shown below (where M represents the metal complex):

M≡≡≡N≡≡≡N end-on

The metal complex may also bind the compound comprising a N≡N bond in an "end-on bridging" arrangement between two metal centres, as shown below (where each M represents a metal complex):

M≡≡≡N≡≡≡N≡≡≡M end-on bridging

Thus, the metal complex of the invention may be complex of the formula $Z_{z'}X_{x'}L_{l'}M\text{-}N\!\equiv\!N\text{-}ML_{l'}X_{x'}Z_{z'}$, wherein M is Cr, Mo, W, Mn, Tc, Re, Fe, Ru, Os, Co, Rh, Ir, Ni, Pd or Pt; L, X and Z are independently the ligating atoms of one or more ligands and l', x' and z' are integers independently taken such that the valence shell of each metal has 18 electrons The metal complex may comprise one or more monodentate and/or polydentate (for example, bidentate, tridentate and/or tetradentate) ligands. For example, where there are five ligating atoms binding to the metal centre (for example where the ligating atoms are L-type and the metal is iron) the metal complex may comprise a structure selected from the following:

wherein each ○ is a monodentate ligand, each is a bidentate or part of a tridentate or tetradentate ligand and M is as defined herein.

The metal complex may comprise a polyhapto ligand. For example, the metal complex may comprise a structure selected from the following:

wherein each ◯ is a monodentate ligand and each represents an optionally substituted polyhapto ligand as described herein (for example, $\eta^5$-cyclopentadiene).

Suitable ligands include:

a) ligands having two electron-donating-ligating atoms (L-type), such as phosphine or phosphite (e.g., P(alkyl)$_3$ or P(O-alkyl)$_3$), sulfide (e.g., S(alkyl)$_2$) and dinitrogen (N$_2$); and b) ligands having one-electron-donating-ligating atoms (X-type), such as H, alkyl (e.g., CH$_3$, CH$_2$CMe$_3$, CH$_2$SiMe$_3$ and CH$_2$CMe$_2$Ph), aryl (e.g., C$_6$H$_5$), dialkylamino (e.g., N(alkyl)$_2$), alkoxy (e.g., O-alkyl) and thiolate (e.g., S-alkyl); and c) polyhapto ligands, such as $\eta^5$-C$_5$(alkyl)$_m$(aryl)$_{m'}$(trialkyl silyl)$_{m''}$H$_n$, where m, m', m" and n are integers and m+m'+m"+n=5.

The one or more ligands may each be independently selected from H, an alkyl ligand, a phosphine ligand, a sulfide ligand, a thiolate ligand, dinitrogen or an optionally substituted $\eta^5$-cyclopentadienyl ligand, or a mixture thereof.

A polydentate ligand may have more than one different ligand type. For example, a ligand may be a phosphine sulfide (e.g., (alkyl)$_2$P-(alkylene)-S-alkyl.

The step of reducing said N≡N bond may comprise reacting the metal complex with a stoichiometric amount of a Lewis acid to form a metal complex comprising a reduced N≡N bond. The step of reducing said N≡N bond may comprise reacting the metal complex with a Lewis acid in a molar ratio of greater than 1 to 1 Lewis acid to metal complex to form a reduced N≡N bond. This may be beneficial in driving any equilibrium of the reaction towards formation of the compound comprising a reduced N≡N bond.

The step of reducing said N≡N bond may comprise reacting the metal complex with a Lewis acid in a molar ratio of at least about 2 to 1 Lewis acid to metal complex to form a reduced N≡N bond, preferably in a molar ratio of about 2:1 Lewis acid:metal complex.

The Lewis acids (such as the alkali metal ions Li$^+$ and Na$^+$) bind the transition metal-bound N$_2$ molecule which facilitates electron transfer from the reducing transition metal centre to weaken the N≡N linkage. Further electron transfer occurs from another transition metal complex comprising a N≡N bond to produce a reduced N≡N bond (such as [FeP$_4$(N—N)]$^{n-}$[K$^+$]$_n$, as well as [Fe$^I$P$_4$]$^+$, where Fe is used as the transition metal). The Lewis acid functions to polarise the N$_2$ molecule. This is an example of the Lewis acids acting as a non-reducible promoter, albeit in the homogeneous phase.

The methods described herein may be carried out in an organic solvent, preferably a solvent selected from the group consisting of ethereal solvents, aromatic solvents or an aliphatic hydrocarbon solvent or a mixture thereof. An ethereal solvent is one that comprises an ether moiety, i.e. a moiety of structure R—O—R', where R and R' are each alkyl groups, the same or different, optionally taken together to form a cyclic group. Exemplary ethereal solvents include ether and tetrahydrofuran. An aromatic solvent is one that contains an aromatic hydrocarbon. Exemplary aromatic solvents include benzene, naptha, toluene and xylene. Exemplary aliphatic hydrocarbon solvents include pentane and hexane. Preferably, the solvent is ether (diethyl ether) or pentane.

The methods described herein may be carried out under an inert atmosphere. An inert atmosphere may be, for example, a Noble Gas (such as argon) or a feedstock for the reaction (for example, nitrogen or hydrogen).

The metal complex comprising a reduced N≡N bond may exist as an intermediate species. The metal complex may exist in a dimeric form, for example comprising the structure -M-NA$_4$N-M, or a monomeric form, for example comprising the structure -M=N—N(A)$_2$ or -M-N(A)$_2$. Thus, the reduced N≡N bond, may be a cleaved N≡N bond, wherein each N atom exists in a monatomic form. Thus, provided herein is metal complex comprising a reduced N≡N, comprising the structure -M-NA$_4$N-M, -M=N—N(A)$_2$, or -M-N(A)$_2$. In such structures, it will be appreciated that ligands and/or further N$_2$ molecules will be present in order to provide a stable metal centre (M).

The following exemplary reaction scheme for the reduction of said N≡N bond, by reacting the metal complex with a Lewis acid is provided for the purposes of illustrating the method:

The reaction results in the formation of a reduced N≡N bond. This reduced N≡N bond is highly activated and is able to react with a source of hydrogen to form N—H bonds.

Thus, the invention also provides a compound comprising a reduced N≡N bond of formula:

wherein M is Cr, Mo, W, Mn, Tc, Re, Fe, Ru, Os, Co, Rh, Ir, Ni, Pd or Pt; L, X and Z are ligating atoms of one or more ligands and l', x' and z' are integers taken such that the valent shell of the metal has 18 electrons; and A is a Lewis acid.

H$_2$ may then be subsequently bound and activated, enabling transfer of H atoms (either as H atoms, H$^+$, or H$^-$, or a combination thereof) to the metal complex comprising a reduced N≡N bond and consequently form new N—H bonds.

The method described herein may further comprise contacting the reduced N≡N bond with a source of hydrogen to form a compound comprising N—H bonds. The compound comprising N—H bonds may be a metal complex comprising N—H bonds.

Thus, overall, the invention may provide a method comprising:
a) providing a metal complex comprising a N≡N bond; and
b) reducing said N≡N bond, by reacting the metal complex with a Lewis acid; and
c) contacting the reduced N≡N bond with a source of hydrogen;
wherein the metal complex comprises Cr, Mo, W, Mn, Tc, Re, Fe, Ru, Os, Co, Rh, Ir, Ni, Pd or Pt.

The method described herein may, therefore, be a method of forming a N—H bond from a metal complex comprising a N≡N bond.

The Lewis acid may preferably be robust to reduction. The Lewis acid may preferably have an electrode potential E(n+)/E(0) more negative than that of the metal complex comprising a N≡N bond to avoid electron transfer from the metal to the Lewis acid, which would reduce it instead, thereby deactivating the Lewis acid. For example, the Lewis acid should have an electrode potential that is more negative than that of the metal complex of more than or equal to 0.1 V. This may ensure a minimal equilibrium of electron transfer between the metal and Lewis acid. The electrode potential values of the Lewis acid and the metal complex may be determined using, for example, an AutoLab potentiostat controlled by Nova. Measurements may be performed inside an $N_2$ glovebox on room temperature THF solutions containing the sample (2 mM) and [$^n$Bu$_4$N][OTf] electrolyte (50 mM). A three-electrode configuration may be employed: a Pt working electrode (PWE) (BASi, Indiana, USA); a Pt wire counter electrode (99.99%; GoodFellow, Cambridge, UK); and an Ag wire pseudo-reference electrode (99.99%; GoodFellow, Cambridge, UK). All electrodes may be polished using alumina/$H_2O$, and all electrodes rinsed with $Et_2O$ and dried in a 100° C. oven prior to each measurement. Measurements may be calibrated to the ferrocenium/ferrocene (Fc/Fc$^+$) couple at the end of each run, and iR compensated to within 80±5% of the solution uncompensated resistance.

The Lewis acid may preferably be robust to reduction.

The Lewis acid may be an alkali metal ion (Li$^+$, Na$^+$, K$^+$, Rb$^+$ or Cs$^+$, optionally Li$^+$, Na$^+$ or K$^+$), an alkaline earth metal ion (Be$^{2+}$, Mg$^{2+}$, Ca$^{2+}$, Sr$^{2+}$ or Ba$^{2+}$, optionally Be$^{2+}$, Mg$^{2+}$ or Ca$^{2+}$), a Scandium ion (e.g. Sc$^{3+}$), a Group 4 metal ion (optionally Ti$^{3+}$, Zr$^{3+}$, Zr$^{4+}$ or Hf$^{4+}$), a Group 13 compound (optionally comprising B$^{3+}$ or Al$^{3+}$), a lanthanide metal ion in the +3 oxidation state (La$^{3+}$, Ce$^{3+}$, Pr$^{3+}$, Nd$^{3+}$, Pm$^{3+}$, Sm$^{3+}$, Eu$^{3+}$, Gd$^{3+}$, Tb$^{3+}$, Dy$^{3+}$, Ho$^{3+}$, Er$^{3+}$, Tm$^{3+}$, Yb$^{3+}$ or Lu$^{3+}$), or a mixture thereof.

The Lewis acid may be provided in the form AB$_p$, wherein A is an alkali metal ion (Li$^+$, Na$^+$, K$^+$, Rb$^+$ or Cs$^+$, optionally Li$^+$, Na$^+$ or K$^+$), an alkaline earth metal ion (Be$^{2+}$, Mg$^{2+}$, Ca$^{2+}$, Sr$^{2+}$ or Ba$^{2+}$, optionally Be$^{2+}$, Mg$^{2+}$ or Ca$^{2+}$), a Scandium ion (e.g. Sc$^{3+}$), a Group 4 metal ion (optionally Ti$^{3+}$, Zr$^{3+}$, Zr$^{4+}$ or Hf$^{4+}$), a Group 13 compound (optionally comprising B$^{3+}$ or Al$^{3+}$), a lanthanide metal ion in the +3 oxidation state (La$^{3+}$, Ce$^{3+}$, Pr$^{3+}$, Nd$^{3+}$, Pm$^{3+}$, Sm$^{3+}$, Eu$^{3+}$, Gd$^{3+}$, Tb$^{3+}$, Dy$^{3+}$, Ho$^{3+}$, Er$^{3+}$, Tm$^{3+}$, Yb$^{3+}$ or Lu$^{3+}$), or a mixture thereof; B is a counteranion; and p is an integer selected such that the charge of B balances the charge of A.

The counteranion B is preferably a weakly coordinating anion. Weakly coordinating anions charge counterbalance their respective cation partner, yet do not form a bond or form only weak interactions such that the reactivity of the cation is high and coordinatively unsaturated (i.e., it is not sequestered through binding of an anion). For simple anions this generally relates to how good a leaving group is, or how strong the conjugate acid of the anion is. As used herein, a weakly coordinating anion is an anion that is as coordinating or less coordinating than [CF$_3$SO$_3$]$^-$. The coordinating strength of an anion may be determined by either of the following methods:

(1) measuring the relative equilibrium constants for exchange of Li$^+$ ions between a benchmark fluorinated anion (e.g. Al{OCPh(CF$_3$)$_2$}$_4$) and the anion in question, which may be determined from $^{19}$F NMR shifts. This is illustrated in S. M. Ivanova et al., Chem. Eur. J., 2001, 7, 503, the entire contents of which are herein incorporated by reference.

(2) using the valence-bond method of I. D. Brown et al., in *Structure and Bonding in Crystals*, Vol. 2, Academic Press, London, 1981, p. 1, the entire contents of which are herein incorporated by reference, to determine the relative strengths of Ag$^+$ contacts between a counteranion from the solid-state structures of Ag(counteranion) salts. This method is particularly useful when the weakly coordinating anion does not contain fluorine atoms (see I. Krossing, Chem. Eur. J., 2001, 7, 490, the entire contents of which are herein incorporated by reference).

Suitable weakly coordinating anions can be found in I. Krossing et al., Angew. Chem. Int. Ed., 2004, 43, 2066-2090, the entire contents of which are herein incorporated by reference.

The method of reducing a N≡N bond of the invention may comprise the following steps:
i) providing a compound comprising a N≡N bond;
ii) reacting the compound comprising a N≡N bond with a reagent of formula to form a metal complex comprising a N≡N bond; and
iii) reducing said N≡N bond, by reacting the metal complex comprising a N≡N bond with a Lewis acid;
wherein M is Cr, Mo, W, Mn, Tc, Re, Fe, Ru, Os, Co, Rh, Ir, Ni, Pd or Pt; L, X and Z are ligating atoms of one or more ligands and l', x' and z' are integers taken such that the valent shell of the metal has 18 electrons; and each X' is independently a leaving group.

Each X' is preferably independently a halide (preferably Cl, Br or I), H, tosylate or triflate. Preferably each X' is independently a halide or H.

The metal complex may be prepared by reacting the compound comprising a N≡N bond with a reagent of formula:

wherein M is Cr, Mo, W, Mn, Tc, Re, Fe, Ru, Os, Co, Rh, Ir, Ni, Pd or Pt; L, X and Z are ligating atoms of one or more ligands and l', x' and z' are integers taken such that the valent shell of the metal has 18 electrons; and each X' is independently a leaving group.

Each X' may preferably independently be a halide (preferably Cl, Br or I), H, tosylate or triflate. Preferably each X' is independently a halide or H. The metal complex may be prepared according to the following reaction scheme:

The reagent may act as a homogenous catalyst for the method.

Preferably the method is a catalytic method. Thus, the reagent may be regenerated.

Figure 1:
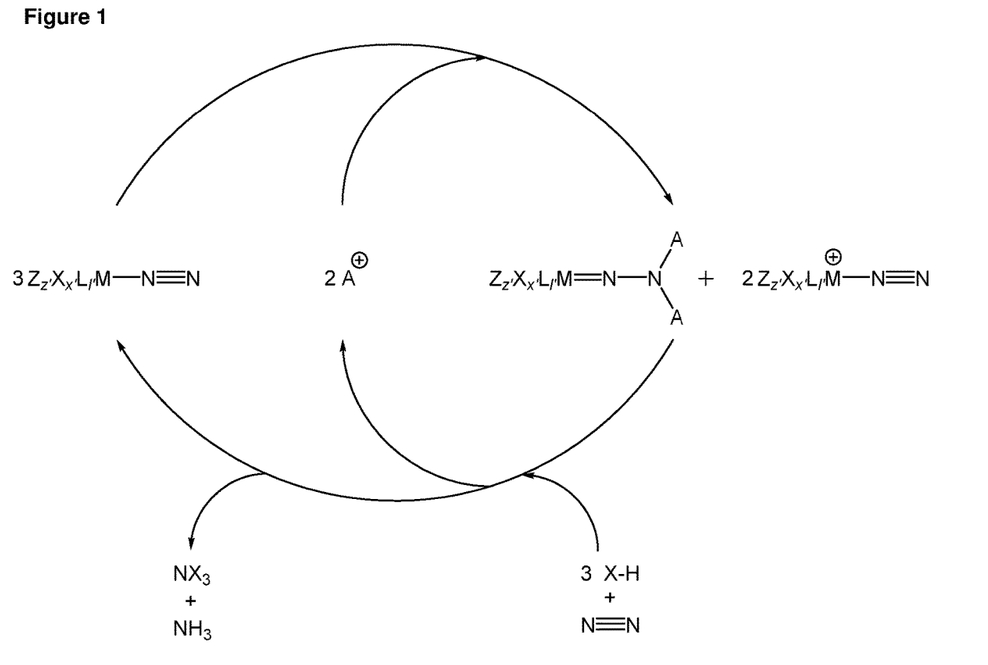
FIG. 1 shows an exemplary catalytic cycle for the method disclosed herein.

An exemplary catalytic cycle for the method of the invention is illustrated in FIG. 1. It will be appreciated that a similar catalytic cycle could be drawn showing a dimeric intermediate as described herein.

FIG. 1 illustrates a catalytic process for the cleavage of a N≡N bond and, thus, fixation of nitrogen to form ammonia comprising reacting a metal complex comprising a N≡N bond with a reducing agent (X—H, wherein X is H or a fragment that bonds to the H through a group that is less electronegative than H, i.e., so H is hydridic) in the presence of a Lewis acid. A stoichiometric amount of the reducing agent may be provided. For example, three molar equivalents of reducing agent may be provided per compound comprising a N≡N bond.

The N≡N bond of the metal complex comprising a N≡N bond is activated by reaction with the Lewis acid. The nitrogen is released from the complex by reaction with a stoichiometric amount of a reducing agent. Thus the reaction produces ammonia in stoichiometric quantities. The overall synthetic route may be considered as:

The reducing agent may be a source of hydrogen. Suitable stoichiometric reducing agents may be metals, such as LiAlH$_4$, NaBH$_4$ and Wilkinson's catalyst in the presence of hydrogen.

Figure 2:
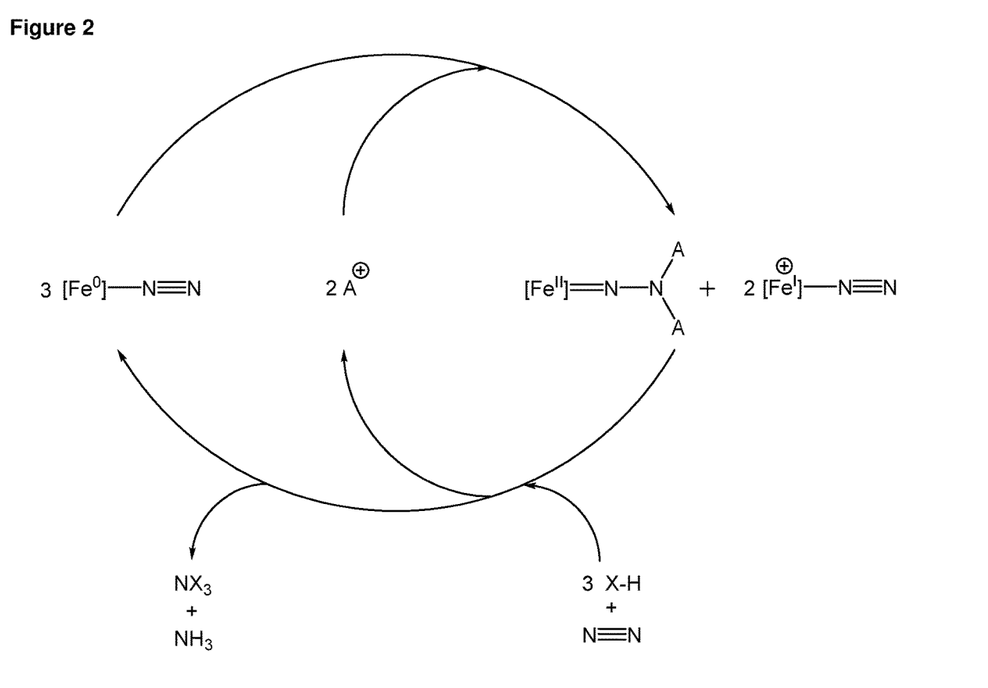
FIG. 2 shows an exemplary catalytic cycle for the method disclosed herein, wherein the metal complex is an iron complex.

As described herein, the metal may be iron. A catalytic cycle for the process where the metal complex is an iron complex is shown in FIG. 2.

The method of the invention may be carried out in a step-wise process or in a one-pot synthesis.

Thus, the invention may further provide a catalytic process for cleaving a N≡N bond, comprising:
    reacting a metal complex comprising a N≡N bond with a stoichiometric amount of a reducing agent in the presence of a Lewis acid.

DEFINITIONS

As used herein, alkyl refers to a straight or branched hydrocarbon chain. An alkyl may have from 1 to 10 carbon atoms optionally 1 to 6 carbon atoms. Exemplary alkyl groups include, without limitation, methyl, ethyl, n-propyl, i-propyl, n-butyl, i-butyl, s-butyl, t-butyl, 2-methylbutyl, n-pentyl, s-pentyl, n-hexyl, 2-ethylhexyl, n-heptyl, n-octyl, etc. An alkyl may be unsubstituted or substituted with one or more of alkyl, cycloalkyl, aryl, OH, alkoxy or amino.

As used herein, aryl refers to an aromatic hydrocarbon ring. Aryl and heteroaryl groups may be mononuclear, i.e. having only one aromatic ring (for example, phenyl or phenylene), or polynuclear, i.e. having two or more aromatic rings which may be fused (for example, napthyl or naphthylene), individually covalently linked (for example, biphenyl), and/or a combination of both fused and individually linked aromatic rings. Aryl groups may contain from 6 to 20 carbon atoms, or from 6 to 12 carbon atoms. An aryl may be fused to one or more aryl or cycloalkyl rings to form a polycyclic ring system. Exemplary aryl groups include, without limitation, phenyl, biphenylene, triphenylene, [1,1':3',1"]terphenyl-2'-ylene, naphthalene, anthracene, binaphthylene, phenanthrene, pyrene, dihydropyrene, chrysene, perylene, tetracene, pentacene, benzpyrene, fluorene, indene, indenofluorene, spirobifluorene, etc. An aryl may be unsubstituted or substituted with one or more of alkyl, cycloalkyl, aryl, OH, alkoxy or amino.

As used herein, cycloalkyl refers to a cyclic alkyl group. A cycloalkyl may have from 3 to 20 cyclic carbon atoms, from 3 to 15 carbon atoms, or from 3 to 10 carbon atoms. Cycloalkyl includes bridged, fused and/or spiro ring systems, such as decalin, norbornane and spiro[5.4]decane. Exemplary cycloalkyl groups include cyclopropyl, cyclobutyl, cyclopentyl, cyclooctyl, decalin, norbornane and spiro[5.4]decane etc. A cycloalkyl may be unsubstituted or substituted with one or more of alkyl, cycloalkyl, aryl, OH, alkoxy or amino.

Throughout the description and claims of this specification, the words "comprise" and "contain" and variations of the words, for example "comprising" and "comprises", mean "including but not limited to", and are not intended to (and do not) exclude other components.

It will be appreciated that variations to the foregoing embodiments of the invention can be made while still falling within the scope of the invention. Each feature disclosed in this specification, unless stated otherwise, may be replaced by alternative features serving the same, equivalent or similar purpose. Thus, unless stated otherwise, each feature disclosed is one example only of a generic series of equivalent or similar features.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

It will be appreciated that many of the features described above, particularly of the preferred embodiments, are inventive in their own right and not just as part of an embodiment of the present invention. Independent protection may be sought for these features in addition to or alternative to any invention presently claimed.

Reference is now made to the following examples, which illustrate the invention in a non-limiting fashion.

EXAMPLES

LiBAr$^F$$_{20}$ (BAr$^F$$_{20}$=[B(C$_6$F$_3$)$_4$]) was synthesised according to the method set out in M. Kuprat et al., Organometallics, 2010, 29, 1421, the entire contents of which are herein incorporated by reference. KBAr$^F$$_4$ and NaBAr$^F$$_4$ (Ar$^F$=3,5-bis(trifluoromethyl)phenyl) were synthesised according to the method set out in N. A. Yakelis et al., Organometallics, 2005, 24, 3579, the entire contents of which are herein incorporated by reference. K[Kross] ([Kross]=[Al(OC{CF$_3$}$_3$)$_4$]) was synthesised according to the method set out in I. Krossing et al., Coord. Chem. Rev., 2006, 250, 2721, the entire contents of which are herein incorporated by reference. FcBAr$^F$$_4$ (Fc=Fe(C$_5$H$_5$)$_2$) was synthesised according to the method set out in J. Le Bras et al., J. Organomet. Chem., 2000, 616, 54.

Synthesis of FeCl$_2$

To a Rotalo ampoule containing Fe metal (250 mg) was added MeOH (2.5 mL), then aqueous 37% HCl (1.0 mL). The ampoule was sealed and heated to 90° C. with stirring for one week to give a homogeneous, pale green solution. The reaction was cooled, and volatiles removed under vacuum to leave a green/white solid. Still under vacuum, this solid was heated to 100° C. for 2 h (giving an off-white solid), then to 160° C. for 3 h, furnishing base-free $FeCl_2$ as a tan solid (532 mg, 95%).

Synthesis of $Fe(Cl)_2(dmpe)_2$ ($dmpe=Me_2PCH_2CH_2PMe_2$)

To a stirred suspension of $FeCl_2$ (2.95 g, 23.3 mmol) in 40 ml PhMe was added dmpe (7 g, 46.6 mmol) dropwise at 0° C. Immediately a green solution formed. After 1 h at room temperature the mixture was warmed to 50° C. and filtered, with the residue being washed with further hot toluene (3×25 ml). The combined filtrate was concentrated in vacuo, and slow cooling of the saturated solution gave green crystals which were collected by filtration, washed with pentane, and dried in vacuo (8.64 g, 87%).

Synthesis of $Fe(Cl)_2(depe)_2$ ($depe=Et_2PCH_2CH_2PEt_2$)

To a suspension of $FeCl_2$ (133.4 mg, 10.4 mmol) in PhMe, depe (441 mg, 2.14 mmol) was added dropwise. The resulting mixture was stirred at room temperature for 2 h to produce a green solution that was filtered, before volatiles were removed under vacuum to give the target compound as a green powdery solid (487 mg, 85%).

Synthesis of $Fe(N_2)(dmpe)_2$ $Fe(Cl)_2(dmpe)_2$ (4 g, 9.37 mmol), $KC_8$ (5.07 g, 37.5 mmol) and a stirrer bar were transferred to a Rotaflo ampoule with a teflon screw-tap and sealed under $N_2$. On a Schlenk line 40 ml of hexane was added and the contents frozen in a liquid $N_2$ bath (external cooling) under 1 bar $N_2$, and the tap sealed once again. The reaction was removed from the cooling bath, thawed (internal pressure of approx. 4 bar) and subsequently stirred for 5 days at room temperature with periodic sonication. The ampoule was then opened, the mixture filtered through a pad of Celite on a glass frit, and the solids extracted with additional hexane (4×40 ml). The filtrate and extracts were combined and the hexane removed under reduced pressure to yield a red powdery solid of $Fe(N_2)(dmpe)_2$ (3.21 g, 93%).

Synthesis of $Fe(N_2)(depe)_2$

A suspension of $Fe(Cl)_2(depe)_2$ (250 mg, 0.46 mmol) and $KC_8$ (313 mg, 2.3 mmol) in pentane in a Rotaflo ampoule under an atmosphere of $N_2$ was pressurised to approximately 4 bar, sealed, and stirred at room temperature for two days. The resulting orange solution was filtered and volatiles removed under vacuum to give the target compound as an orange powdery solid (184 mg, 80%).

Synthesis of $[Fe(depe)_2][BAr^F_4]$ ($Ar^F$=3,5-bis(trifluoromethyl)phenyl)

To a stirred suspension of $Fe(N_2)(depe)_2$ (59 mg, 0.12 mmol) in $Et_2O$ (2.5 mL) under an Ar atmosphere was added in portions $[Fc]BAr^F_4$ ($Fc=Fe(C_5H_5)_2$), resulting in a deep blue solution. Volatiles were removed under vacuum and the resulting solid washed with pentane until these washings became colourless, leaving the target as a dark blue solid.

Reaction of $Fe(N_2)(depe)_2$ with K[Kross] ([Kross]=[Al(OC{CF_3}_3)_4])

$Fe(N_2)(depe)_2$ (29.8 mg, 0.06 mmol) and K[Kross] (120.7 mg, 0.12 mmol) were dissolved in $Et_2O$ or pentane (3.0 mL) and stirred at room temperature for several minutes before volatiles were removed under vacuum resulting in blue solids.

Preparation of Mass Spectrometry and ESR Samples

All spectra were acquired on a time-of-flight (ToF) mass spectrometer in ES+ mode.

CW-ESR spectra were collected on 0.1 ml samples (Et2O solvent) in J Youngs-valve-modified quartz EPR tubes at the Center for Advanced ESR (CAESR) in the Inorganic Chemistry Laboratory at the University of Oxford. X-band measurements performed with a Bruker-Biospin Micro EMX-plus spectrometer equipped with a PremiumX microwave bridge, a cylindrical TE011 resonator (SHQE-VV), an ESR-900 liquid helium cryostat, and an Oxford Instruments ITC-503s temperature controller.

(1) Reaction of Fe-dinitrogen-phosphine complexes with alkali-metal ions:

(a) Inside an Ar or $N_2$-filled glovebox $Fe(N_2)(dmpe)_2$ (0.01 mmol) was dissolved in $^t$BuOMe (0.5 mL) and K[Kross] (0.025 mmol) added, with stirring. Approximately 25 µL of the resulting solution was then transferred to a screw-cap mass spectrometry vial and the total volume made up to 1 mL with $Et_2O$. The sample was then injected into a mass spectrometer for analysis.

(b) Inside an Ar or $N_2$-filled glovebox $Fe(N_2)(depe)_2$ (0.01 mmol) was dissolved in either $Et_2O$, THF or $^t$BuOMe (0.5 mL) and either $LiBAr^F_{20}$ (0.025 mmol) or $MBAr^F_4$ (M=Na, K; 0.025 mmol) added, with stirring. Approximately 25 µL of the resulting solution was then transferred to a screw-cap mass spectrometry vial and the total volume made up to 1 mL with $Et_2O$. The sample was then injected into a mass spectrometer for analysis, with a 0.1 ml aliquot reserved in a quartz ESR tube for ESR experiments.

(2) Reaction of Fe-dinitrogen-phosphine complex with alkali-metal ions, followed by reaction with hydrogen ($H_2$): Inside an Ar or $N_2$-filled glovebox $Fe(N_2)(dmpe)_2$ (0.01 mmol) was dissolved in $^t$BuOMe (0.5 mL) in a small glass vial, and K[Kross] (0.025 mmol) added, with stirring. The solution was subsequently pipetted into a J. Youngs NMR tube and removed from the box, and attached to a Schlenk line. The tube was immersed in liquid $N_2$ and frozen (external cooling), thereafter the J. Youngs valve was opened and the gaseous contents evacuated under vacuum, before $H_2$ gas (1 bar) was admitted. The tube was then removed from the cold bath and thawed to room temperature, whereupon the solution turned colourless, and then the valve closed. The tube was then taken back into an Ar or $N_2$-filled glovebox, the valve opened and contents of the tube decanted into a small glass vial. Approximately 25 µL of the resulting solution was then transferred to a screw-cap mass spectrometry vial and the total volume made up to 1 mL with $Et_2O$. The sample was then injected into a mass spectrometer for analysis.

Mass spectra for the reaction of $Fe(N_2)(depe)_2$ with $KBAr^F_4$; a peak at 573.1329 was assigned to an ion with the formula $C_{20}H_{48}N_2P_4^{39}K_2^{56}Fe$ (predicted: 573.1313)—$[Fe(N_2Na_2)(depe)_2]^+$.

Mass spectra for the reaction of $Fe(N_2)(depe)_2$ with $NaBAr^F_4$; a peak at 542.1920 was assigned to an ion with the formula $C_{20}H_{48}N_2P_4^{23}Na_2^{56}Fe$ (predicted: 542.1868)—$[Fe(N_2Na_2)(depe)_2]^+$.

Mass spectra for the reaction of $Fe(N_2)(depe)_2$ with $LiBAr^F_{20}$; a peak at 510.2448 was assigned to an ion with the formula $C_{20}H_{48}N_2P_4^7Li_2^{56}Fe$ (predicted: 510.2408)—$[Fe(N_2Li_2)(depe)_2]^+$.

The following mass spectral data provide evidence for cleavage of the $N_2$ bond (i.e. activation of the bond):

Mass spectra for the reaction of $Fe(N_2)(dmpe)_2$ with K[Kross] in $^t$BuOMe: two major peaks were assigned to ions with the formulae $[Fe(dmpe)_2(N_2)(NK_2)]^+$ (found: 476.0730; predicted: 476.0170) and $[Fe(dmpe)_2(N_2)_2(NK_2)]^+$ (found 504.1046; predicted: 504.0232).

Mass spectra for the reaction of $Fe(N_2)(depe)_2$ with K[Kross] in $^t$BuOMe: two major peaks were assigned to ions with the formulae $[Fe(depe)_2(N_2)(NK_2)]^+$ (found: 588.1978;

predicted: 588.1422) and [Fe(depe)$_2$(N$_2$)$_2$(NK$_2$)]$^+$ (found 616.2269; predicted: 616.1484).

The following mass spectral data provides evidence for hydrogenation of N$_2$ following activation with alkali metal ions:

Mass spectra for the reaction of Fe(N$_2$)(dmpe)$_2$ with K[Kross] in $^t$BuOMe followed by H$_2$; a major peak was assigned to an ion with the formula [Fe(NH$_3$)(dmpe)$_3$]$^+$ (found: 523.1324; predicted: 523.1796).

ESR spectra of solutions of Fe(0) Fe(N$_2$)(depe)$_2$ and A$^+$B$^-$ (A=Li, Na, K; B=BArF$_{20}$, BArF$_{24}$; under N$_2$) show the diagnostic signal for Fe(I) [Fe(N$_2$)(depe)$_2$][BAr$^F_4$], which provides clear evidence of electron transfer (Fe(0)→Fe(I)+e$^-$).

The donated electrons are used to reduce other molecules of Fe(N$_2$)(depe)$_2$ activated by alkali metal (A) ions, giving [Fe(N$_2$A$_2$)(depe)$_2$]$^+$ the latter being observed in the mass spectra.

For example, the following reactions can be considered to have occurred:

(1)

(2)

Figure 3:
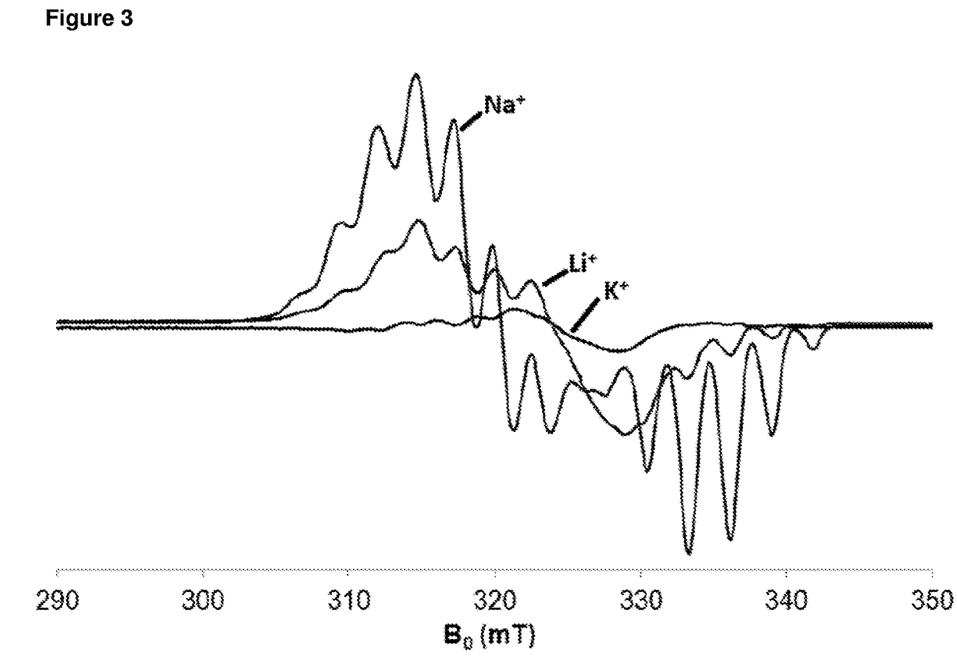
FIG. 3 shows X-band ESR spectra of equivalent reactions of $Fe(N_2)(depe)_2$ and $A^+B^-$ (A=Li, Na, K; B=$BArF_{20}$, $BArF_{24}$).

FIG. 3 shows the ES X-band ESR spectra of equivalent reactions of Fe(N$_2$)(depe)$_2$ and A$^+$B$^-$ (A=Li, Na, K; B=BArF$_{20}$, BArF$_{24}$) recorded as glasses at 40 K; THF solution.

Figure 4:
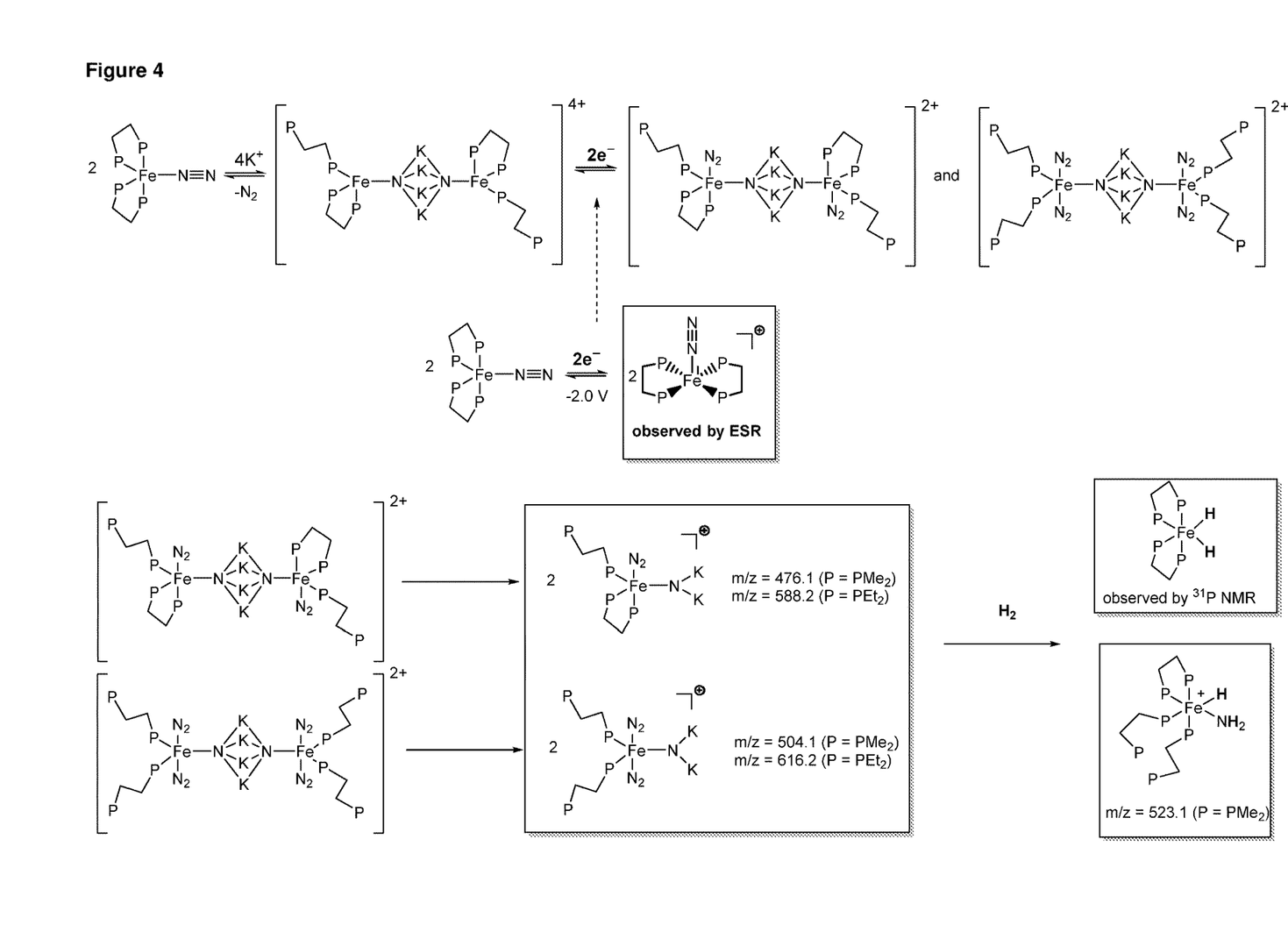
FIG. 4 shows a proposed reaction scheme for the reduction of $N_2$ in $Fe(N_2)(depe)_2$ or $Fe(N_2)(dmpe)_2$ and the subsequent reaction with $H_2$.

FIG. 4 shows a proposed reaction scheme for the reduction of N$_2$ in Fe(N$_2$)(depe)$_2$ or Fe(N$_2$)(dmpe)$_2$ and the subsequent reaction with H$_2$ based on the results obtained above. The species observed by mass spectrometry and/or ESR are identified in this reaction scheme.

While preferred embodiments of the present invention have been shown and described herein, it will be apparent to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention and that methods and structures within the scope of these claims and their equivalents be covered thereby.

The invention claimed is:

1. A method for reducing a N≡N bond comprising:
  a) providing a metal complex comprising a N≡N bond; and
  b) reducing said N≡N bond, by reacting the metal complex with a Lewis acid;
  wherein the metal complex comprises Fe, Ru, or Os;
  wherein the method is a catalytic method; and
  wherein the Lewis acid is an alkali metal ion, an alkaline earth metal ion, a Scandium ion, a Group 4 metal ion, a Group 13 ion, a lanthanide metal ion in the +3 oxidation state, or a mixture thereof.

2. The method of claim 1, wherein the molar ratio of Lewis acid to metal complex comprising a N≡N bond is greater than 1 to 1.

3. The method of claim 1, wherein the metal complex comprising a N≡N bond has the formula Z$_{z'}$X$_{x'}$L$_{l'}$M-N≡N, wherein M is Fe, Ru, or Os; L, X and Z are ligating atoms of one or more ligands and l', x' and z' are integers taken such that the valence shell of the metal has 18 electrons.

4. The method of claim 3, wherein the one or more ligands are independently H, an alkyl ligand, a phosphine ligand, a sulfide ligand, a thiolate ligand, dinitrogen or an optionally substituted η$^5$-cyclopentadienyl ligand, or a mixture thereof.

5. The method of claim 4, wherein the phosphine ligand is independently:

a) a monophosphine ligand having the formula wherein each R is independently alkyl or aryl, each optionally substituted with one or more of alkyl, cycloalkyl, aryl, OH, alkoxy or amino;

b) a diphosphine ligand having the formula wherein each R is independently alkyl or aryl, each optionally substituted with one or more of phenyl, OH or C$_{1-6}$ alkoxy; and Y is an alkylene linker having 1-6 carbon atoms optionally interrupted with aryl, —NH—, —N(alkyl)-, —S—, —S(alkyl)-, —PH$_2$—, —PH(alkyl)-, —PH(aryl)-, —P(alkyl)$_2$- and optionally substituted with one or more of alkyl, cycloalkyl, aryl, OH, alkoxy or amino;

c) a triphosphine ligand having the formula wherein each R is independently alkyl or aryl, each optionally substituted with one or more of aryl, OH or alkoxy; and each Y is independently an alkylene linker having 1-6 carbon atoms optionally interrupted with aryl, —NH—, —N(alkyl)-, —S—, —S(alkyl)-, —PH$_2$—, —PH(alkyl)-, —PH(aryl)-, —P(alkyl)$_2$- and optionally substituted with one or more of alkyl, cycloalkyl, aryl, OH, alkoxy or amino; and/or d) a tetraphosphine ligand having the formula

-continued e) wherein each R is independently alkyl or aryl, each optionally substituted with one or more of aryl, OH or $C_{1-6}$ alkoxy; and each Y is independently an alkylene linker having 1-6 carbon atoms optionally interrupted with aryl, —NH—, —N(alkyl)-, —S—, —S(alkyl)-, —PH$_2$—, —PH(alkyl)-, —PH(aryl)-, —P(alkyl)$_2$- and optionally substituted with one or more of alkyl, cycloalkyl, aryl, OH, alkoxy or amino.

6. The method of claim 4, wherein:
   a) an alkyl ligand has the structure $CR^2_3$, wherein each $R^2$ is independently H, trialkyl silyl, aryl optionally substituted with one or more of alkyl, cycloalkyl, aryl, OH, alkoxy or amino or $CR^3_3$, wherein each $R^3$ is independently alkyl, trialkyl silyl, cycloalkyl or aryl, each optionally substituted with one or more of alkyl, cycloalkyl, aryl, OH, alkoxy or amino, or two $R^3$ taken with the atom to which they are attached to form a cycloalkyl ring, optionally substituted with one or more of alkyl, cycloalkyl, aryl, OH, alkoxy or amino;
   b) a sulfide ligand has the structure $SR^4_2$, wherein each $R^4$ is independently alkyl, cycloalkyl or aryl, each optionally substituted with one or more of alkyl, cycloalkyl, aryl, OH, alkoxy or amino;
   c) a thiolate ligand has the structure $SR^4$, wherein each $R^4$ is independently alkyl, cycloalkyl or aryl, each optionally substituted with one or more of alkyl, cycloalkyl, aryl, OH, alkoxy or amino; and/or
   d) a pentahapto cyclopentadienyl ligand is optionally substituted with alkyl, aryl or trialkyl silyl.

7. The method of claim 1, wherein the metal complex comprising a N≡N bond has the formula 8. The method of claim 1, wherein the metal complex comprising a N≡N bond is a Fe complex.

9. The method of claim 1, wherein the Lewis acid is provided in the form $AB_p$, wherein A is an alkali metal ion, an alkaline earth metal ion, a Scandium ion, a Group 4 metal ion, a Group 13 ion, a lanthanide metal ion in the +3 oxidation state, or a mixture thereof; B is a counteranion; and p is an integer selected such that the charge of B balances the charge of A.

10. The method of claim 9, wherein B is a borate-based anion, a carborane-based anion, a phosphate anion, a sulfonate anion, a perfluoroalkoxyaluminate anion, an imide anion or an alkoxy- or aryloxymetallate.

11. The method of claim 9, wherein B is selected from the following:

where q is an integer from 1 to 10, optionally 1 to 6, optionally 1.

12. The method of claim 1, wherein the step of reducing said N≡N bond, by reacting the metal complex comprising a N≡N bond with a Lewis acid is carried out under an inert atmosphere and optionally in an organic solvent.

13. The method of claim 1, comprising:
   i) providing a compound comprising a N≡N bond;
   ii) reacting the compound comprising a N≡N bond with a reagent of formula $Z_zX_xL_{l'}M\text{-}X'_2$, to form a metal complex comprising a N≡N bond; and
   iii) reducing said N≡N bond, by reacting the metal complex comprising a N≡N bond with a Lewis acid;
   wherein M is Fe, Ru, or Os; L, X and Z are ligating atoms of one or more ligands and l', x' and z' are integers taken such that the valence shell of the metal has 18 electrons; and each X' is independently a leaving group; and
   the Lewis acid is an alkali metal ion, an alkaline earth metal ion, a Scandium ion, a Group 4 metal ion, a Group 13 ion, a lanthanide metal ion in the +3 oxidation state, or a mixture thereof.

14. The method of claim 13, wherein the step of reacting the compound comprising a N≡N bond with a reagent is carried out in the presence of a reducing agent and/or in an organic solvent.

15. The method of claim 1, wherein the compound comprising a N≡N bond is gaseous $N_2$ or a complex binding $N_2$.

16. The method of claim 15, wherein the compound comprising a N≡N bond is gaseous $N_2$ and the reaction is carried out under a $N_2$ atmosphere at a pressure of about 100 to about 1000 kPa.

17. The method of claim 1 further comprising:
c) contacting the reduced N≡N bond with a source of hydrogen.

18. The method of claim 17, wherein the metal complex comprising a reduced N≡N bond is contacted with gaseous H₂ at a pressure of about 100 to about 1000 kPa.

19. The method of claim 17, where the method results in a cleaved N≡N bond and formation of a N—H bond.

20. The method of claim 13, wherein the one or more ligands are independently H, an alkyl ligand, a phosphine ligand, a sulfide ligand, a thiolate ligand, dinitrogen or an optionally substituted η⁵-cyclopentadienyl ligand, or a mixture thereof.

21. The method of claim 20, wherein a phosphine ligand is independently:
a) a monophosphine ligand having the formula wherein each R is independently alkyl or aryl, each optionally substituted with one or more of alkyl, cycloalkyl, aryl, OH, alkoxy or amino;
b) a diphosphine ligand having the formula wherein each R is independently alkyl or aryl, each optionally substituted with one or more of phenyl, OH or $C_{1-6}$ alkoxy; and Y is an alkylene linker having 1-6 carbon atoms optionally interrupted with aryl, —NH—, —N(alkyl)-, —S—, —S(alkyl)-, —PH₂—, —PH(alkyl)-, —PH(aryl)-, —P(alkyl)₂- and optionally substituted with one or more of alkyl, cycloalkyl, aryl, OH, alkoxy or amino;
c) a triphosphine ligand having the formula wherein each R is independently alkyl or aryl, each optionally substituted with one or more of aryl, OH or alkoxy; and each Y is independently an alkylene linker having 1-6 carbon atoms optionally interrupted with aryl, —NH—, —N(alkyl)-, —S—, —S(alkyl)-, —PH₂—, —PH(alkyl)-, —PH(aryl)-, —P(alkyl)₂- and optionally substituted with one or more of alkyl, cycloalkyl, aryl, OH, alkoxy or amino; and/or
d) a tetraphosphine ligand having the formula wherein each R is independently alkyl or aryl, each optionally substituted with one or more of aryl, OH or $C_{1-6}$ alkoxy; and each Y is independently an alkylene linker having 1-6 carbon atoms optionally interrupted with aryl, —NH—, —N(alkyl)-, —S—, —S(alkyl)-, —PH₂—, —PH(alkyl)-, —PH(aryl)-, —P(alkyl)₂- and optionally substituted with one or more of alkyl, cycloalkyl, aryl, OH, alkoxy or amino.

22. The method of claim 13, wherein the Lewis acid is $Li^+$, $Na^+$, $K^+$, $Rb^+$, $Cs^+$, $Be^+$, $Mg^{2+}$, $Ca^{2+}$, $Sr^{2+}$, $Ba^{2+}$, $Sc^{3+}$, $Ti^{3+}$, $Zr^{3+}$, $Zr^{4+}$, $Hf^{4+}$, $B^{3+}$, $Al^{3+}$, $La^{3+}$, $Ce^{3+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$ or $Lu^{3+}$, or a mixture thereof.

23. The method of claim 13, wherein the Lewis acid is provided in the form $AB_p$, wherein A is an alkali metal ion, an alkaline earth metal ion, a Scandium, a Group 4 metal ion, a Group 13 ion, a lanthanide metal ion in the +3 oxidation state, or a mixture thereof; B is a counteranion; and p is an integer selected such that the charge of B balances the charge of A.

\* \* \* \* \*

UNITED STATES PATENT AND TRADEMARK OFFICE
CERTIFICATE OF CORRECTION

PATENT NO. : 11,827,652 B2
APPLICATION NO. : 17/281852
DATED : November 28, 2023
INVENTOR(S) : Andrew Ashley Page 1 of 2

It is certified that error appears in the above-identified patent and that said Letters Patent is hereby corrected as shown below:

In the Claims

Claim 5, Column 20, Lines 40-49 should read:

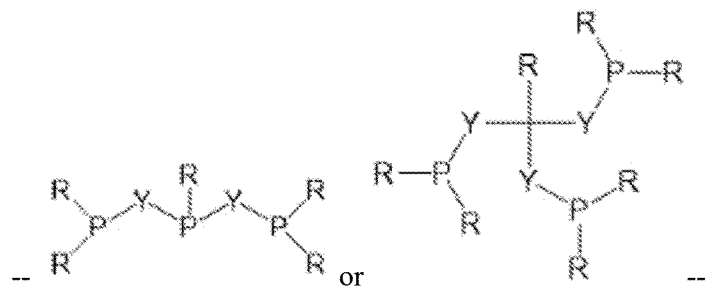

Claim 5, Column 21, Lines 1-10 should read:

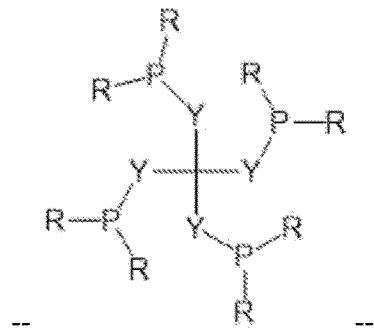

Signed and Sealed this
Second Day of January, 2024

Katherine Kelly Vidal
Katherine Kelly Vidal
*Director of the United States Patent and Trademark Office*

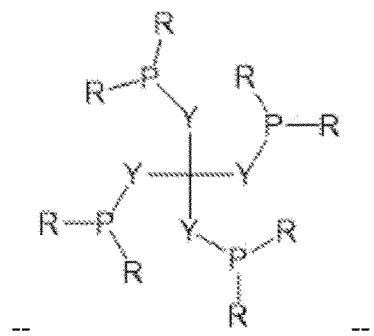

Claim 21, Column 23, Lines 41-50 should read:
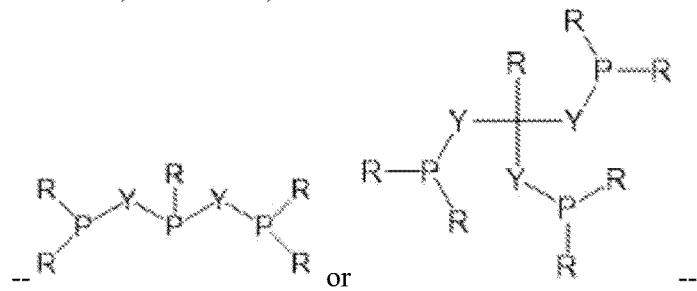
or
Claim 21, Column 24, Lines 17-26 should read: